C. E. TOMPPERT.
CALKING FERRULE.
APPLICATION FILED MAY 11, 1916.
1,238,458.
Patented Aug. 28, 1917.
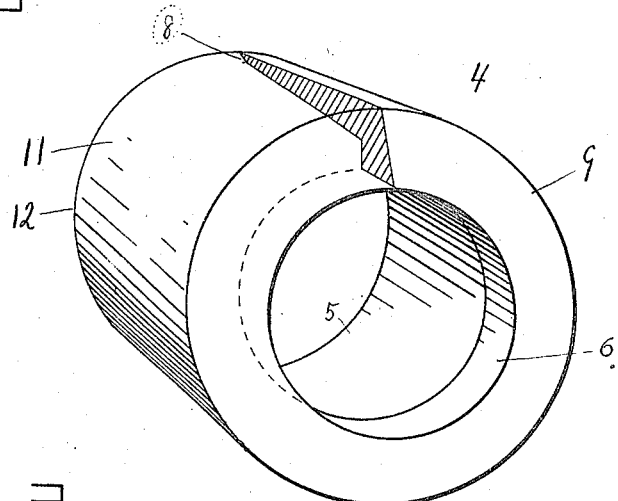
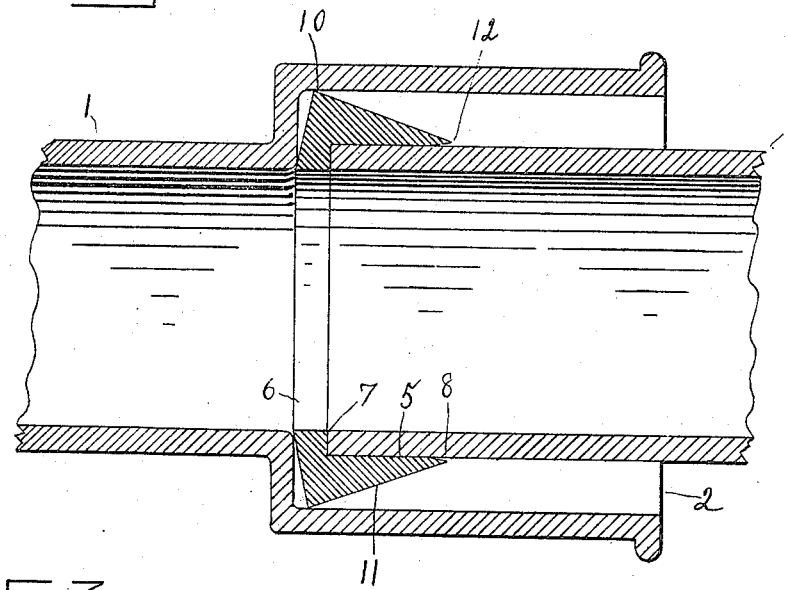
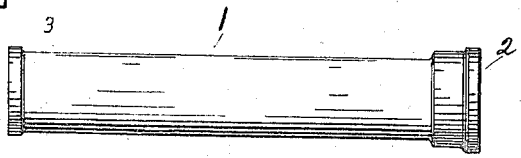
INVENTOR.
Charles E. Tomppert
BY
W. B. Munnell
ATTORNEY.

UNITED STATES PATENT OFFICE.

CHARLES E. TOMPPERT, OF LOUISVILLE, KENTUCKY.

CALKING-FERRULE.

1,238,458.  Specification of Letters Patent.  Patented Aug. 28, 1917.

Application filed May 11, 1916. Serial No. 96,779.

*To all whom it may concern:*

Be it known that I, CHARLES E. TOMPPERT, a citizen of the United States, and a resident of Louisville, county of Jefferson, and State of Kentucky, have invented a new and useful Calking-Ferrule, of which the following is a specification.

This invention relates to a ferrule, or ring, adapted to be affixed to the spigot end of a pipe before inserting it in the hub, or socket of an adjacent pipe, to which it is to be joined.

Pipe, especially cast iron pipe is marketed in stated lengths which have on one end a hub, or socket, and on the other or spigot end a bead. This bead fits closely in the socket of a preceding pipe, leaving a space between the outer wall of the pipe and the inner wall of the socket for the reception of calking material. The bead serves to center the entering pipe in the socket, and also prevents entrance, to the interior of the pipe, of oakum or other fibrous material used in calking the joint. In making an installation of piping it is frequently necessary to use a piece, shorter than the commercial lengths, and a length is cut. A cold chisel is usually employed to score the pipe at the point where it is to be severed, and force is then applied to fracture it along the incised line, with the result that the end is rough and uneven and will not fit closely against the bottom of the socket of the preceding pipe, consequently the oakum is apt to escape, through the interstices into the interior of the pipe. The spigot end of the short piece having no bead it is difficult to center in a socket, as tamping the oakum, or soft metal used in making the joint, harder on one side than the other, will force the pipe to one side. And should the line of pipe be a horizontal run, the absence of the bead will permit the line to sag, the entrant pipe acting with the metallic calking as a fulcrum to compress the fiber.

An object of this invention is to provide a ferrule, or ring, to be applied to the end of a pipe and serve as a bead therefor, thus permitting short lengths of pipe to be used with the same effectiveness, as regular lengths.

With the foregoing and other objects in view the invention consists of the novel construction illustrated in the accompanying drawing, which forms a part of this specification, wherein is set forth an embodiment of the invention, but it is to be understood that such changes and modifications may be resorted to as come within the scope of the appended claim.

Referring now to the drawing, wherein similar reference characters designate like parts in the several views, Figure 1 is a perspective view of my device: Fig. 2, a central longitudinal section of a joint between two lengths of pipe, made with the aid of my calking ferrule: Fig. 3, a side elevation, on a reduced scale of a commercial length of cast iron pipe.

Referring now more particularly to the drawing —1— designates a commercial length of cast iron pipe, having a hub, or socket —2— and a bead —3— at the spigot end thereof. —4— designates my improved ferrule, which comprises an integral member, comprising a continuous ring formed of any suitable material, such as malleable iron provided with a major bore —5—, adapted to fit over the exterior of the pipe on which it is to be used, being a drive fit thereon, and a minor bore —6— of substantially the same diameter as the interior of the pipe to which it is to be applied. A shoulder, or offset —7— between the two bores abuts against the end of the pipe. The outward end of the major bore is relieved, or enlarged slightly at —8— to facilitate starting the ferrule on the pipe. The extreme outside diameter of the ferrule is such that it will fit snugly in the socket of an adjoined pipe. The forward end, or face —9— has a rearward inclination, from the mouth of the minor bore to a point of extreme diameter —10— sufficient to insure a firm seat against the bottom of the socket. The outer surface, or periphery, —11— slopes from the point 10 to the rear end —12—. When cast iron pipe is cut, the severed ends are usually very uneven, as the operation is accomplished mainly by fracturing the metal. A length of pipe having been cut a ferrule is driven on the spigot end of the part to be used, until the internal annular shoulder of the ferrule contacts with the most prominent projection on the end of the pipe. The calking operation may then be proceeded with in the customary manner. The inclined face of the ferrule adapts it to contact closely with the internal rounded edge at the juncture of the socket 2 with the pipe 1, thereby forming as good, if not better joint than would have been the case with the original bead. Soil pipe is cast in sand and consequently is apt to have surface irregularities of more or less altitude, which when on the interior of the socket, may oppose the passage of a bead or the ferrule. In some instances such irregularities, if near the entrance of the socket may be passed by canting the entrant pipe to one side, the shape of the ferrule lends itself well to such a method. In other cases of slight projections the edge 10, being thin, may yield and pass the projection. The receding face of the ferrule enables it to seat closely even though there should be rough places in the bottom of the socket. The taper of the rear portion of the ferrule enables it to have a maximum contact with the surface of the pipe while occupying a minimum of space, in the socket. The triangular space formed between the periphery of the ferrule and the inner surface of the socket permits of the use of a smaller quantity of oakum and a more efficient calking thereof than under the usual conditions wherein the walls of the pipe and socket are parallel all the way down to the bottom, which lies at right angles to the said walls.

Having described my invention so that anyone skilled in the art may make and use the same, I claim:

A calking ferrule, the point of extreme exterior diameter of which is spaced from the forward end thereof, one section thereof sloping abruptly from said point to the forward end and another section sloping more gradually therefrom to the rear end of the ferrule, said sections having respectively minor and major bores.

CHARLES E. TOMPPERT.

Copies of this patent may be obtained for five cents each, by addressing the "Commissioner of Patents, Washington, D. C."